United States Patent [19]
Landis et al.

[11] Patent Number: 5,536,106
[45] Date of Patent: Jul. 16, 1996

[54] CONNECTION BETWEEN A SHAFT AND A HUB

[75] Inventors: Paul M. Landis, Englewood, Ohio; Lon A. Offenbacher, Rochester, Mich.

[73] Assignee: General Motors Corporation, Detroit, Mich.

[21] Appl. No.: 385,945

[22] Filed: Feb. 9, 1995

[51] Int. Cl.⁶ .................................................. F16B 2/14
[52] U.S. Cl. .......................... 403/374; 403/325; 403/383; 74/552; 280/779
[58] Field of Search ................................ 403/374, 373, 403/303, 409.1, 355, 325, 320, 321, 24; 74/552; 280/779

[56] References Cited

U.S. PATENT DOCUMENTS

| | | |
|---|---|---|
| 1,438,004 | 12/1922 | Vincent . |
| 1,494,515 | 5/1924 | Vincent .................................. 74/552 |
| 1,600,456 | 9/1926 | Diekmann . |
| 2,580,986 | 1/1952 | Yohn ...................................... 74/552 |
| 2,835,777 | 5/1958 | Gates et al. ......................... 74/552 X |
| 3,523,464 | 8/1970 | Quillery et al. ..................... 74/552 |
| 4,216,568 | 8/1980 | Anderson .......................... 403/374 X |
| 4,229,994 | 10/1980 | Plamper .............................. 74/552 |
| 4,662,775 | 5/1987 | Faul .................................... 74/552 X |
| 4,819,961 | 4/1989 | Henigue ............................. 74/552 X |
| 4,884,469 | 12/1989 | Wrigley .............................. 74/552 |
| 4,892,007 | 1/1990 | Haldric et al. ..................... 74/552 |
| 4,938,094 | 7/1990 | Cochard .............................. 74/552 |
| 5,172,607 | 12/1992 | Wu ...................................... 74/552 |
| 5,326,186 | 7/1994 | Nyberg ............................... 403/325 X |
| 5,398,946 | 3/1995 | Quiring .............................. 403/325 X |

FOREIGN PATENT DOCUMENTS

| | | | |
|---|---|---|---|
| 220813 | 1/1957 | Australia ........................... 403/409.1 |
| 3727638 | 3/1988 | Germany ........................... 74/552 |

*Primary Examiner*—Kenneth J. Dorner
*Assistant Examiner*—Harry C. Kim
*Attorney, Agent, or Firm*—Saul Schwartz

[57] ABSTRACT

A connection between a shaft and a hub includes a straight bore in the hub, a plunger bore in the hub intersecting the straight bore, a straight end on the shaft matching the straight bore in the hub, a longitudinal notch in the straight end of the shaft which faces and cooperates with the plunger bore in defining a plunger chamber between the shaft and the hub, a plunger moveable back and forth in the plunger bore, and a spring urging the plunger toward the shaft. A hub side of the plunger chamber defined by the plunger bore converges with a shaft side of plunger chamber defined by the longitudinal notch. The spring biases an enlarged head of the plunger toward the apex of the plunger chamber. The angles of convergence between the plunger bore and the straight bore, and between the hub side and shaft side of the plunger chamber, are calculated to assure that the enlarged head of the plunger positively resists forced dislodgement of the shaft from the hub by becoming progressively more tightly wedged between the hub side and the shaft side of the plunger chamber.

7 Claims, 3 Drawing Sheets

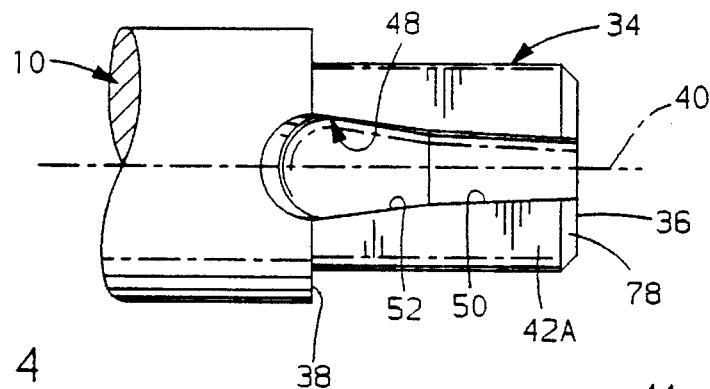
FIG. 4
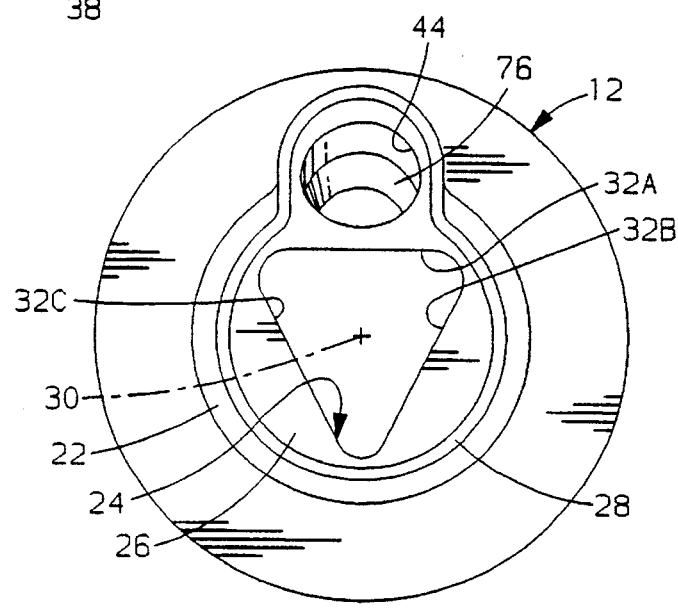
FIG. 5
FIG. 6
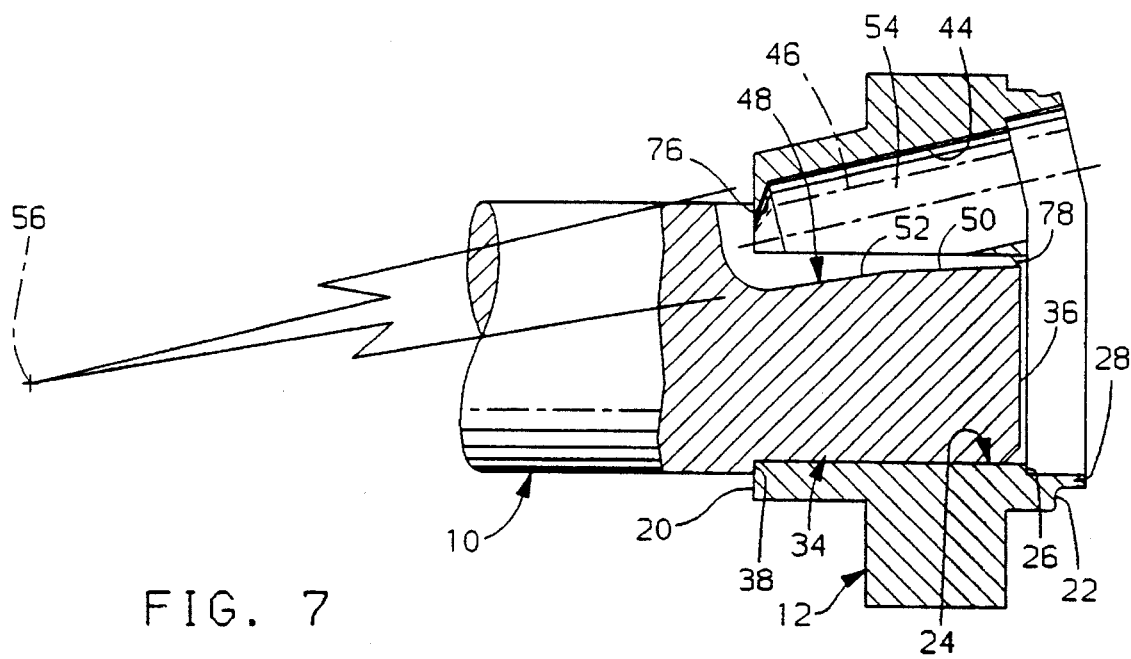
FIG. 7

5,536,106

CONNECTION BETWEEN A SHAFT AND A HUB

FIELD OF THE INVENTION

This invention relates to apparatus for connecting a shaft, e.g. a motor vehicle steering shaft, to hub, e.g. a hub of a motor vehicle steering wheel.

BACKGROUND OF THE INVENTION

Motor vehicle steering wheels commonly include a metal hub having a bore therethrough with straight and tapered portions. The straight portion is internally splined and receives an externally splined straight end of a steering shaft. The tapered portion receives a correspondingly tapered shoulder on the steering shaft adjacent the straight end. A blocked spline tooth is received in a groove in the straight end of the shaft for angular alignment of the steering wheel relative to the steering shaft. The tapered portion of the hub bore is forcibly seated on the tapered shoulder on the shaft, and the hub is retained on the shaft, by a steering wheel retaining nut on a threaded end of the steering shaft. The splines on the shaft and on the hub have tight manufacturing tolerances and are, therefore, relatively expensive to manufacture and difficult to assemble. The longitudinal position of the steering wheel on the steering shaft, i.e. "draw down", is difficult to control due to the combined effects of the torque tolerance range applicable to the steering wheel retaining nut and manufacturing tolerances applicable to the tapered portion of the hub bore and to the tapered shoulder on the steering shaft.

SUMMARY OF THE INVENTION

This invention is a new and improved connection between a shaft, e.g a motor vehicle steering shaft, and a hub, e.g. a hub of a motor vehicle steering wheel, including a straight bore in the hub, a plunger bore in the hub intersecting the straight bore, a straight end on the shaft shaped to fit in the straight bore in the hub, a longitudinal notch in the straight end of the shaft which faces and cooperates with the plunger bore in defining a plunger chamber when the straight end of the shaft is in a seated position in the straight bore in the hub, a plunger moveable back and forth in the plunger bore, and a spring urging the plunger toward the shaft. A hub side of the plunger chamber is defined by a side of the plunger bore. A shaft side of the plunger chamber is defined by the longitudinal notch and converges with the hub side toward an apex of the plunger chamber. The spring biases an enlarged head of the plunger toward the apex of the plunger chamber. The angles of convergence between the plunger bore and the straight bore, and between the hub side and shaft side of the plunger chamber, are calculated to assure that the enlarged head of the plunger positively resists forced dislodgement of the shaft from the hub by becoming more tightly wedged between the hub side and the shaft side of the plunger chamber. In a preferred embodiment, the straight end of the shaft has a cam thereon which engages the enlarged head of the plunger to stroke the plunger to a retracted position so that the straight end of the shaft can achieve, in snap-on fashion, the aforesaid seated position in the straight bore.

BRIEF DESCRIPTION OF THE DRAWINGS

FIG. 4 is a view taken generally along the plane indicated by lines 4—4 in FIG. 3;

FIG. 5 is a sectional view taken generally along the plane indicated by lines 5—5 in FIG. 3;

FIG. 6 is a view taken generally along the plane indicated by lines 6—6 in FIG. 3; and FIG. 7 is a similar to FIG. 1 but showing the connection according to this invention with some elements removed for clarity.

DESCRIPTION OF A PREFERRED EMBODIMENT

Figure 1:
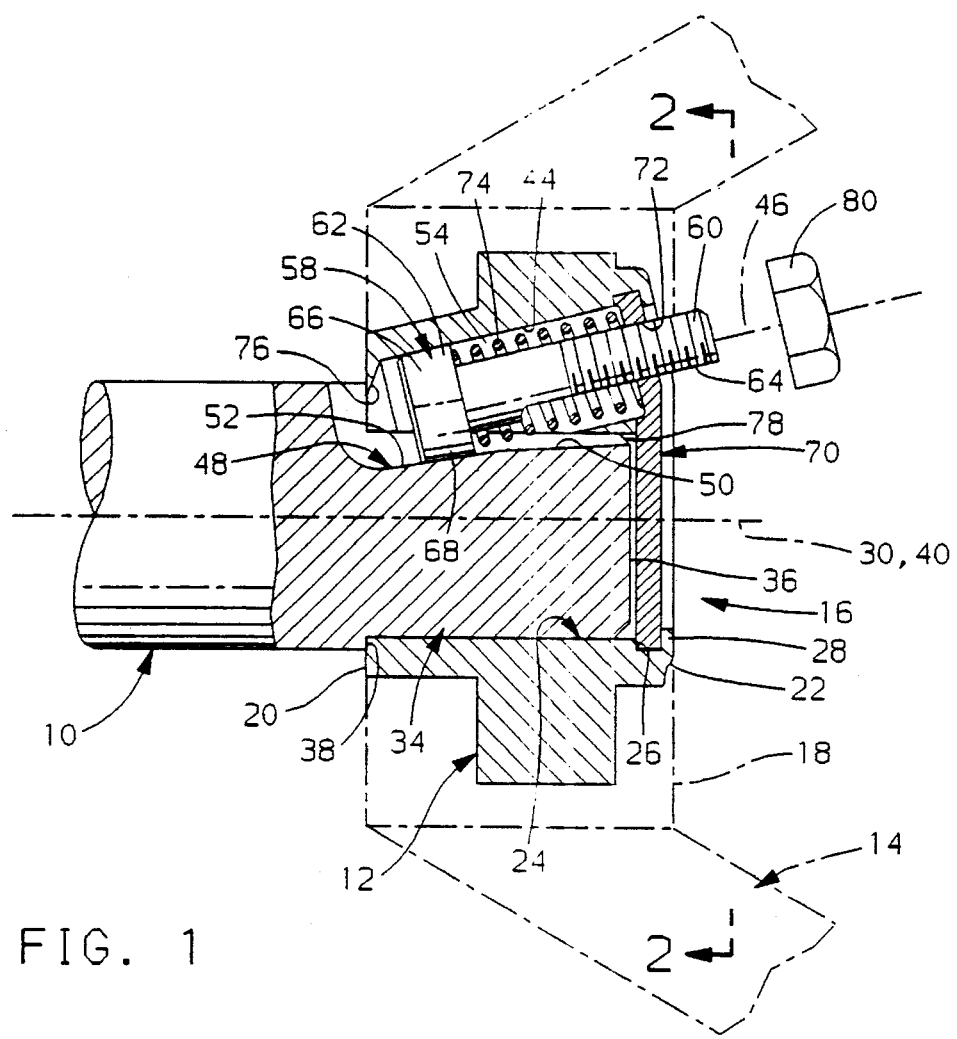
FIG. 1 is a partially broken-away, elevational view of a connection according to this invention between a shaft and a hub.
Figure 2:
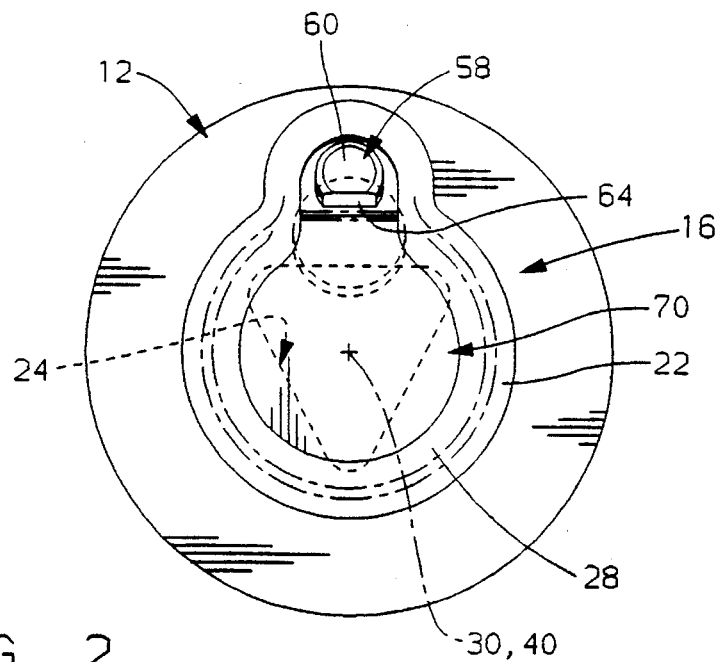
FIG. 2 is a view taken generally along the plane indicated by lines 2—2 in FIG. 1.

As seen best in FIGS. 1–6, a shaft 10, e.g. a motor vehicle steering shaft, is attached to a hub 12, e.g. a hub of a motor vehicle steering wheel 14, by a connection 16 according to this invention. The hub 12, made of metal and molded into a plastic center portion 18 of the schematically represented steering wheel 14, has an inboard side 20 and an outboard side 22. A straight bore 24 traverses the hub 12 from the inboard side 20 to a bottom 26 of a generally keyhole-shaped recess in the outboard side 22 surrounded by an integral lip 28. The bottom 26 around the straight bore 24 is perpendicular to a longitudinal centerline 30, FIG. 3, of the straight bore. The straight bore 24 is triangular in cross section perpendicular to the centerline 30 and includes a plurality of flat sides 32A–C, FIG. 6, parallel to the centerline 30.

Figure 3:
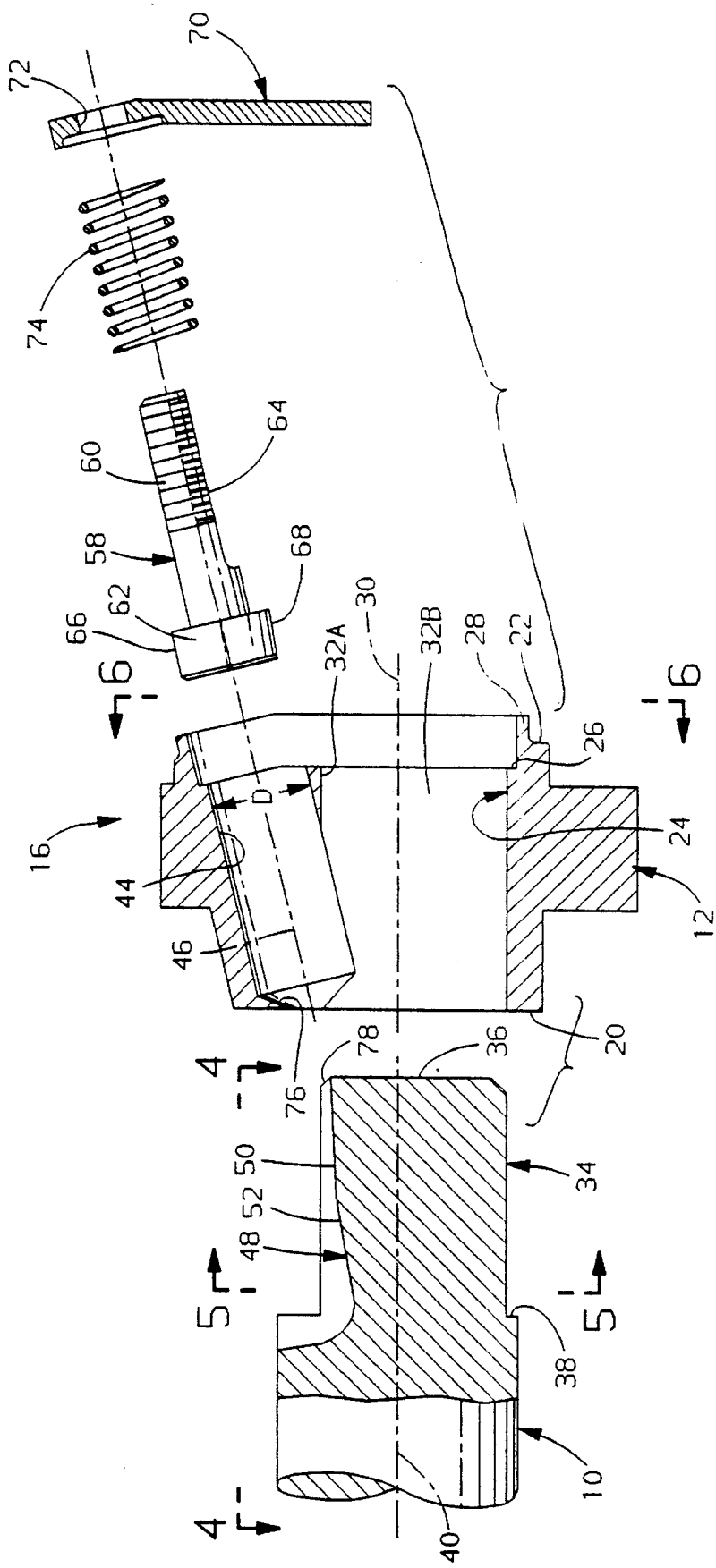
FIG. 3 is an exploded, partially broken-away, elevational view of the connection according to this invention.

A straight end 34 of the shaft 10 extends from a tip 36 of the shaft to a shoulder 38 in a plane perpendicular to a longitudinal centerline 40, FIG. 3, of the shaft. The straight end 34 is triangular in cross section perpendicular to the centerline 40, FIG. 5, and includes a plurality of flat sides 42A–C parallel to the centerline. The flat sides 42A–C of the straight end of the shaft match the flat sides 32A–C of the straight bore in the hub so that the hub is mounted on the shaft for rotation as a unit therewith by inserting the straight end of the shaft to a seated position, FIG. 1, in the straight bore defined by engagement of the inboard side 20 of the hub against the shoulder 38 on the shaft.

The hub 12 has a cylindrical plunger bore 44 therein which intersects the side 32A of the straight bore 24 and, also, the bottom 26 of the keyhole-shaped recess in a small area part of the recess. The plunger bore 44 has a diameter "D", FIG. 3, and a centerline 46 in a common plane with the centerline 30 of the straight bore. The centerline 46 intersects the centerline 30 at an angle of about 12°. The bottom 26 of the keyhole-shaped recess around the plunger bore 44 is perpendicular to the centerline 46.

A longitudinal, trough-shaped notch 48 in the straight end 34 of the shaft 10 extends from the tip 36 to the shoulder 38 and includes an outboard part 50 adjacent the tip and an inboard part 52 adjacent the shoulder 38. As seen best in FIG. 7, the inboard part 52 of the notch is steeper than the outboard part 50 and intercepts the longitudinal centerline 40 of the shaft 10 at an angle of about 8°. The notch 48, in cross section, has a radius of curvature "R", FIG. 5, substantially equal to one half of the diameter "D" of the plunger bore 44.

In the seated position of the straight end 34 of the shaft in the straight bore 24 in the hub, FIG. 7, the inboard part 52 of the notch 48 cooperates with the plunger bore 44 in defining a plunger chamber 54 between the shaft and the hub. The plunger chamber 54 has a hub side defined by the wall of the plunger bore exposed through the flat side 32A of the shaft bore where the plunger bore intersects the shaft bore. The plunger chamber 54 has a shaft side defined by the inboard part 52 of the notch 48 which converges with the hub side toward an imaginary apex 56, FIG. 7, of the plunger chamber. The angle of convergence between the hub side and the shaft side of the plunger chamber is preferably about 4°.

A plunger 58 is disposed in the plunger bore 44 for back and forth bodily movement in the direction of the centerline 46. The plunger 58 has an externally screw threaded shank 60 and an enlarged head 62 integral with the shank. A flat side 64 on the shank extending in the length direction thereof renders the shank generally D-shaped in cross section, FIG. 2. The enlarged head 62 is disposed generally in the plunger chamber 54 and has a curved upper side 66 in flush sliding engagement with the hub side of plunger chamber, i.e. with the wall of the plunger bore, and a curved lower side 68 in flush sliding engagement with the shaft side of the plunger chamber, i.e. with the inboard part 52 of the notch 48. To achieve flush sliding engagement with the converging hub side and shaft side of the plunger chamber, the upper and lower sides 66, 68 have the same radii of curvature as the plunger bore 44 and the notch 48, respectively, and also converge toward the apex 56 of the plunger chamber.

A keyhole-shaped retainer 70 is seated on the bottom 26 over the straight bore 24 and over the plunger bore 44. The lip 28 is staked over the retainer 70 to prevent dislodgement of the latter from the hub. The retainer 70 has a D-shaped hole 72 therein, FIG. 3, aligned with the plunger bore for reception of the shank 60 of the plunger 58 whereby rotation of the plunger in the plunger bore relative to the hub is prevented without interfering with back and forth bodily movement of the plunger. A spring 74 around the shank of the plunger seats at one end against the enlarged head 62 of the plunger and at the other end against the retainer 70 and biases the plunger toward the shaft 10.

Initially, when the hub 12 is remote from the shaft 10, the spring 74 biases the enlarged head 62 of the plunger against a stop defined by shoulder 76 at the bottom of the plunger bore 44 so that the enlarge head of the plunger partially obstructs the straight bore 24. The flat side 42A of the straight end 34 of the shaft 10 is aligned with the flat side 32A of the straight bore 24 in the hub and the tip 36 is inserted into the straight bore. A chamfer 78, FIGS. 1 and 3, on the shaft where the flat side 42A intersects the tip 36 defines a cam which engages the enlarged head 62 of the plunger as the straight end of the shaft is urged toward its seated position and strokes the plunger against the spring 74 to a retracted position, not shown, almost wholly within the confines of the plunger bore.

After the chamfer 78 clears the enlarged head 62 of the plunger, the enlarged head is biased by the spring 74 into the notch 48. As the straight end 34 of the shaft penetrates the straight bore 24 to its seated position, the enlarged head slides, first, across the outboard part 50 of the notch and, second, across the inboard part 52. In the seated position of the straight end 34 of the shaft, the spring 74 biases the plunger to an extended position, FIG. 1, in which the enlarged head 62 is wedged between the hub side and the shaft side of the plunger chamber 54. The spring 74 also acts, through the enlarged head of the plunger, to wedge the sides 42B–C of the straight end of the shaft between the sides 32B–C of the straight bore in the hub to eliminate clearance between the shaft and the hub for transfer of torque without angular lash.

The angle between the centerline 46 of the plunger bore 44 and the centerline 30 of the straight bore 24, and the angle of convergence between the hub side and the shaft side of the plunger chamber 54, are calculated to induce force reactions on the enlarged head of the plunger which more tightly wedges the enlarged head between the hub side and the shaft side of the plunger chamber in response to efforts to forcibly dislodge the straight end 34 from the straight bore 24. The hub 12, therefore, attaches to the shaft 10 in simple snap-on fashion without nuts, bolts or other fastening devices and is positively retained on the shaft by the plunger 58. In the event that removal of the steering wheel from the shaft becomes necessary, a nut 80, FIG. 1, is threaded onto the shank 60 of the plunger outside of the retainer 70 and rotated in a tightening direction to stroke the plunger to its retracted position.

We claim:

1. A connection between a motor vehicle steering shaft and a hub of a motor vehicle steering wheel comprising:

a straight bore in said hub, a straight end on said shaft shaped to penetrate said straight bore to a seated position therein, a plunger bore in said hub intersecting said straight bore, a longitudinal notch in said straight end of said shaft cooperating with said plunger bore in said seated position of said straight end of said shaft in said straight bore in said hub in defining a plunger chamber, said plunger chamber having a hub side defined by a wall of said plunger bore exposed through a side of said straight bore and a shaft side defined by said longitudinal notch converging with said hub side toward an apex of said plunger chamber, a plunger in said plunger bore moveable back and forth in the direction of a longitudinal centerline of said plunger bore, and a spring biasing said plunger toward an extended position wherein an end of said plunger is wedged between said shaft side and said hub side of said plunger chamber, said end of said plunger positively preventing dislodgement of said straight end of said shaft from said straight bore in said hub by becoming progressively more tightly wedged between said shaft side and said hub side of said plunger chamber in response to attempted forced dislodgement of said straight end of said shaft from said straight bore in said hub.

2. The connection between a shaft and a hub recited in claim 1 further comprising:

a cam means on said straight end of said shaft engageable on said end of said plunger when said straight end of said shaft is inserted in said straight bore in said hub and advanced toward said seated position therein operative to stroke said plunger against said spring to a retracted position removed from said straight bore, said spring biasing said plunger to said extended position following passage of said cam means past said end of said plunger so that retention of said straight end of said shaft in said straight bore in said hub is effected in snap-on fashion.

3. The connection between a shaft and a hub recited in claim 2 wherein:

said straight bore in said hub includes a flat side parallel to a longitudinal centerline of said straight bore, and said straight end on said shaft includes a flat side parallel to a longitudinal centerline of said shaft and engageable on said flat side of said straight bore in said hub to prevent relative rotation between said hub and said shaft in said seated position of said straight end of said shaft in said straight bore in said hub.

4. The connection between a shaft and a hub recited in claim 3 further comprising:

an enlarged head on said plunger in said plunger chamber, a shank on said plunger integral with said enlarged head having a flat side extending in a length direction of said shank, and a retainer on said hub having a hole therein slidably receiving said shank of said plunger with a flat side of said hole in said retainer facing said flat side of said shank to prevent rotation of said plunger in said plunger bore relative to said hub, said spring being disposed between said retainer and said enlarged head of said plunger.

5. The connection between a shaft and a hub recited in claim 4 further comprising:

a screw thread on said shank of said plunger traversing said hole in said retainer on said hub, and a nut on said screw thread engageable on an outboard side of said retainer when said nut is rotated on said shank of said plunger in a tightening direction to stroke said plunger against said spring from said extended position to said retracted position.

6. The connection between a shaft and a hub recited in claim 5 wherein:

said straight bore in said hub is triangular in cross section perpendicular to said longitudinal centerline of said straight bore, and said straight end of said shaft is triangular in cross section perpendicular to said longitudinal centerline of said shaft.

7. The connection between a shaft and a hub recited in claim 6 wherein:

said plunger bore in said hub is a cylindrical bore, said longitudinal notch in said straight end of said shaft is a trough-shaped channel having a radius of curvature substantially equal to one half of the diameter of said cylindrical plunger bore, and said enlarged head of said plunger has a first curved side in flush sliding engagement on a wall of said plunger bore and a second curved side in flush sliding engagement on said straight end of said shaft in said trough-shaped channel.

* * * * *